United States Patent
Itoh et al.

(10) Patent No.: US 7,079,469 B2
(45) Date of Patent: Jul. 18, 2006

(54) HOLOGRAM RECORDING/REPRODUCING SYSTEM

(75) Inventors: Yoshihisa Itoh, Tsurugashima (JP);
Satoru Tanaka, Tsurugashima (JP);
Akihiro Tachibana, Tsurugashima (JP);
Yoshihisa Kubota, Tsurugashima (JP);
Kazuo Kuroda, Tsurugashima (JP);
Satoshi Sugiura, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 45 days.

(21) Appl. No.: 10/516,692

(22) PCT Filed: May 16, 2003

(86) PCT No.: PCT/JP03/06142

§ 371 (c)(1),
(2), (4) Date: Dec. 6, 2004

(87) PCT Pub. No.: WO2004/013705

PCT Pub. Date: Feb. 12, 2004

(65) Prior Publication Data
US 2005/0169094 A1 Aug. 4, 2005

(30) Foreign Application Priority Data
Aug. 1, 2002 (JP) .............................. 2002-224363

(51) Int. Cl.
*G11B 7/00* (2006.01)

(52) U.S. Cl. ..................................... 369/103

(58) Field of Classification Search ................ 369/103, 369/112.1, 112.01, 112.02, 118, 44.23
See application file for complete search history.

(56) References Cited

U.S. PATENT DOCUMENTS

| 5,995,251 | A   | 11/1999 | Hesselink et al. |
| 6,233,083 | B1  | 5/2001  | Minagawa |
| 6,256,281 | B1* | 7/2001  | Tanaka et al. ............... 369/103 |

FOREIGN PATENT DOCUMENTS

| JP | 52-56952 A  | 5/1977 |
| JP | 2-248980 A  | 10/1990 |

* cited by examiner

*Primary Examiner*—Nabil Hindi
(74) *Attorney, Agent, or Firm*—Sughrue Mion, PLLC

(57) ABSTRACT

A hologram recording and reproducing system having compatibility has: a supporting unit for freely attachably supporting a recording medium including a photosensitive material; a signal light-generating unit for projecting a coherent light beam modulated according to a predetermined data into a recording medium and generating a diffraction grating by providing a three-dimensional light interference pattern in the recording medium; a detector unit for detecting and photoelectrically converting a diffracted light from the diffraction grating; and a demodulating unit for demodulating a predetermined data from an output from the detector unit. The detector unit has an intermediate data-generating unit for generating an intermediate data, and the demodulating unit has a conversion table in which the intermediate data and the predetermined data are uniquely associated, and demodulates the predetermined data by performing a computation based on a correlation in the conversion table.

4 Claims, 4 Drawing Sheets

HOLOGRAM RECORDING/REPRODUCING SYSTEM

TECHNICAL FIELD

The present invention relates to a holographic recording medium and a recording and reproducing system utilizing this.

BACKGROUND ART

To date, hologram recording systems have been known as a digital information recording system that utilizes the principle of hologram. A feature of this system is to record an information signal into a recording medium as a change in a refractive index. Photorefractive materials such as a single crystal lithium niobate or the like are used for the recording medium. In a hologram recording medium, data can be recorded and reproduced in the units of two-dimensional plane pages, and multiplexed recording is possible by using a plurality of pages. The outline of the recording medium system is explained below.

At the time of recording, in a conventional 4f system hologram recording and reproducing apparatus, a laser light beam 12 emanating from a laser light source 11 is split into lights 12a and 12b by a beam splitter 13, as shown in FIG. 1. The light 12a is shaped into a substantially collimated light, the beam diameter of which is enlarged by a beam expander BX, and is projected onto a spatial light modulator (SLM) such as a transmissive-type TFT liquid crystal display (Thin Film Transistor Liquid Crystal Display) (hereinafter also referred to as "LCD") panel or the like. An encoder 25 converts a digital data to be recorded in a recording medium 10 into an bright and dark dot-pattern image on a plane and rearranges it into a data array of, for example, 480 vertical bits×640 horizontal bits. The encoder generates a unit-page series data and sends out the data to the spatial light modulator SLM.

When the light 12a transmits through the spatial light modulator SLM, it is light-modulated and turned into a signal light containing a data signal component. The signal light 12a containing the dot pattern signal component passes through a Fourier transform lens 16, which is spaced apart by its focal distance f, and the dot pattern signal component is Fourier transformed. Then, the light is gathered into a recording medium 10.

On the other hand, the light beam 12b split by the beam splitter 13 is guided as a reference light into the recording medium 10 by mirrors 18 and 19, and it intersects the light path of the signal light 12a within the recording medium 10, forming a light interference pattern. Thus the entirety of the light interference pattern is recorded as a change in the refractive index (refractive index grating). In addition, it becomes possible to record a plurality of two-dimensional plane data with angle multiplexing by varying the incident angle of the reference light 12b onto the recording medium 10.

At the time of reproducing, inverse Fourier transform is performed to reproduce the dot pattern image. As shown in FIG. 1, for example, the light path of the signal light 12a is blocked by the spatial light modulator SLM so that only the reference light 12b is projected onto the recording medium 10. The reference light 12b is controlled by the mirror driven in the position and angle thereof with a combination of the rotation and linear movement so that the incident angle thereof results in the same as that of the reference light at the time when the page to be reproduced has been recorded. A reproduced light that reconstructs the recorded light interference pattern appears on a side of the recording medium 10 that is opposite the side thereof that is irradiated with the reference light 12b. When this reproduced light is guided to the inverse Fourier transform lens 16a and is inverse Fourier-transformed, the dot pattern image can be reconstructed. Further, this dot pattern image is received by a photodetector 20 such as a charge coupled device (CCD) or the like at the focal distance position, and the image is reconverted into an electrical digital data signal. Thereafter, the data signal is sent to a decoder 26, and the original page data is reproduced.

In the recording and reproducing system shown in FIG. 1, according to the rules of Fourier transform and inverse Fourier transform, the transmitted light for, for example, the portion of the image data "A" as shown in FIG. 2(a) that is displayed on the spatial light modulator SLM is Fourier-transformed and recorded into the recording medium as an interference pattern of Fourier transform pattern, and the image of the image data A that has been inverse Fourier-transformed as shown in FIG. 2(b) is reproduced on the CCD 20 from the recording medium illuminated with the reference light. Therefore, the conventional recording and reproducing system necessitates a CCD 20 that is similar to the spatial light modulator SLM with 480 vertical bits×640 horizontal bits and has the same resolution. The precondition is that the recording and reproducing system uses a fixed conversion rule for the recording system and the reproducing system to perform recording and reproducing.

For this reason, it is required for the conventional recording and reproducing system to keep optical distortion, deviation of the signal image, or the like that occurs in the Fourier transform optical system, the inverse Fourier transform optical system, and other optical systems, within a predetermined specified value range. This requires such components as high-precision lenses or the like for the optical systems, and moreover a high-precision relative position adjustment is necessary. Furthermore, since the transfer of pixel data is performed, an expensive detector such as a CCD or the like is required in order to perform high-speed data transfer.

Accordingly, an example of the problem that the present invention intends to solve is to provide a hologram recording and reproducing system that does not require an inverse Fourier lens.

DISCLOSURE OF THE INVENTION

A hologram recording and reproducing system of the invention has a supporting unit for freely attachably supporting a recording medium (including a photosensitive material such as a photorefractive polymer, a hole burning material, a photochromic material, etc.); a signal light-generating unit for projecting a coherent light beam modulated according to a predetermined data into the recording medium and generating a refractive index grating by providing a three-dimensional light interference pattern in the recording medium; a detector unit for detecting and photoelectrically converting a diffracted light from the refractive index grating; and a demodulating unit for demodulating a predetermined data from an output from the detector unit, the hologram recording and reproducing system characterized in that: the detector unit has an intermediate data-generating unit for generating an intermediate data, and the demodulating unit has a conversion table in which the intermediate data and the predetermined data are uniquely associated, and demodulates the predetermined data by performing an operation based on a correlation in the conversion table.

BEST MODE FOR CARRYING OUT THE INVENTION

Hereinbelow, embodiments of the present invention are explained with reference to the drawings.

In a hologram recording and reproducing system of the present embodiment, an intermediate data is reproduced in advance and the reproduced intermediate data is computed based on a correlation in a predetermined conversion table that has been stored in advance, to demodulate an original data, in the case in which conversion rules are different between the recording system and the reproducing system. The case in which the conversion rules are different between the recording system and the reproducing system is as follows. In the recording system, a Fourier transform recording is carried out by a Fourier transform lens optical system. However, in the reproducing system, the following cases are included: the case in which conversion is performed using not only the inverse Fourier transform lens optical system but also an additional optical system to obtain an intermediate data and demodulation is performed; and the case in which a detected intermediate data is inverse Fourier-transformed by a computer and a predetermined data is thereby demodulated instead of using the inverse Fourier transform lens.

In the hologram recording and reproducing system of this embodiment, a conversion table is defined in advance. Examples of the conversion table are an inverse Fourier computing device, one in which a Fourier transform pattern in the vicinity of the Fourier plane is uniquely associated with a data that has not yet been Fourier-transformed, one in which a positional data that is output from a predetermined position sensor is uniquely associated with each of the data that are recorded in a reference data-holding hologram, etc. Various conversion tables are defined in advance for other recording medium formats, and the conversion tables are recorded in a non-volatile memory of the recording and reproducing system upon shipment. It is also possible to record the conversion tables in a rewritable memory.

Figure 3:
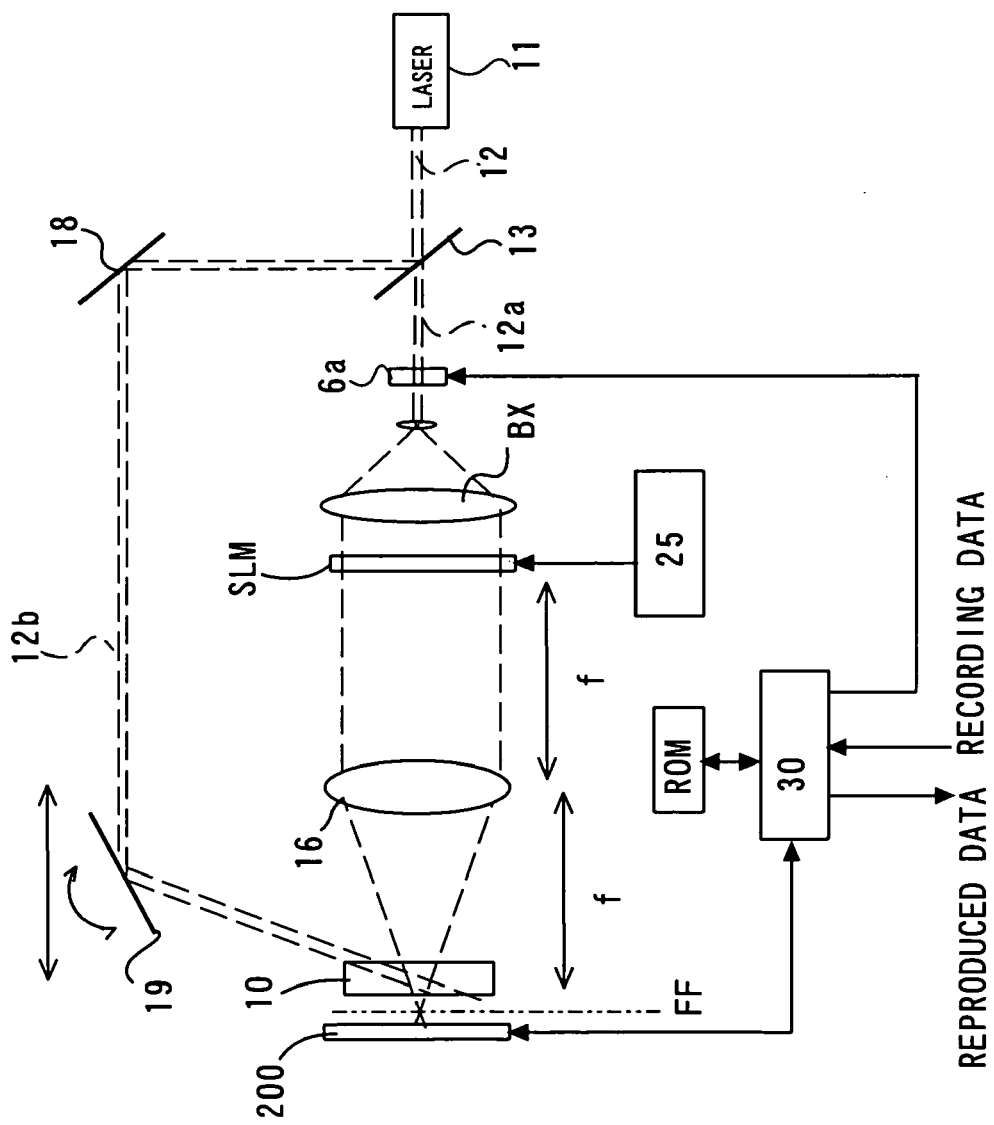
FIG. 3 is a diagrammatic view showing the configuration of an embodiment of a recording medium system according to the invention.

FIG. 3 shows an example of a first embodiment of a recording and reproducing system according to the invention.

In this embodiment, the inverse Fourier transform lens is not used, as shown in FIG. 3; a light-receiving face of a photo-detector 200 such as a two-dimensional light sensor or the like is disposed in the vicinity of the Fourier plane FF, and a recording medium 10 is disposed in the upstream of the photo-detector 200, that is, between the photo-detector 200 and a Fourier transform lens 16. In addition, the recording and reproducing system has a similar configuration to that of the conventional one except that the system is equipped with the inverse Fourier computing device and a non-volatile memory ROM that is connected to a controller 30 and stores a conversion table in which a Fourier transform pattern in the vicinity of the Fourier plane is associated with a data that has not yet been Fourier transformed. At the time of reproducing, the controller 30 computes a predetermined original data from a reproduced Fourier transform pattern according to the inverse Fourier computing device. It should be noted that the photo-detector 200 is sufficient as long as it can obtain the Fourier transform pattern as intermediate data, and the position of the photo-detector 200 may be in the vicinity of either the front or the back of the Fourier plane.

First, at the time of recording, a light beam emanating from a laser light source 11 is split by a beam splitter 13 into two beams, a signal light beam that propagates linearly and a reference light beam that deflects upward. The respective beams are guided to respective light paths of signal and reference light beam optical systems.

Figure 2:
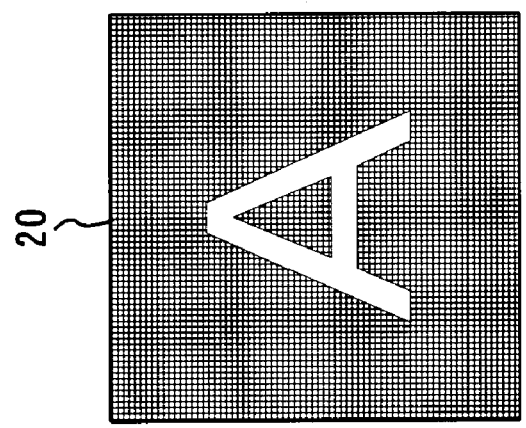
FIG. 2 is a view for illustrating image data that appears on a spatial light modulator and a CCD.
Figure 4:
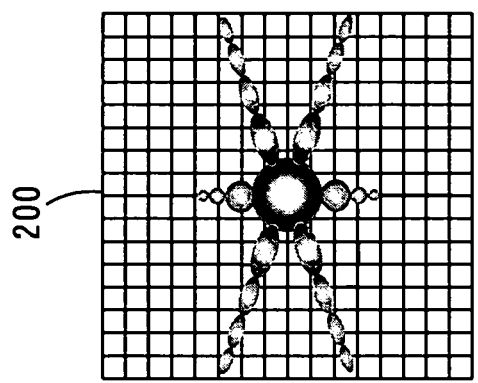
FIG. 4 is a view for illustrating a Fourier transform pattern that appears on a light-receiving face of a photo-detector in the vicinity of the Fourier plane.

The signal light beam 12a that has passed through the beam splitter 13 goes through a shutter 6a, a light beam expander BX, a spatial light modulator SLM, and a Fourier transform lens 16, and enters a recording medium 10. The time during which the signal light beam 12a is projected to the recording medium is controlled by the automatic shutter 6a, which is controlled by the controller 30, and the signal light beam is enlarged by the beam expander BX into a collimated light having a predetermined diameter. The spatial light modulator SLM is, for example, a transmissive LCD with a two-dimensional plane of 480 pixels vertically× 640 pixels horizontally, and converts the light beam from the beam expander BX into signal light according to a digital recording data supplied from an encoder 25. For example, when the data displayed on the spatial light modulator SLM is the image data A shown in FIG. 2(a) and light transmits through that portion, turning to signal light, the image data A is Fourier-transformed and a Fourier transform pattern as shown in FIG. 4 is generated in the vicinity of the Fourier plane FF. Accordingly, the data is recorded in the recording medium 10 as an interference pattern of the reference light and the signal light that has not yet reached the Fourier transform pattern. Generally, by the spatial light modulator SLM, a data is spatial-modulated according to a recording page data into a two-dimensional dot pattern in which each pixel is transmissive or non-transmissive; thereafter, it is Fourier-transformed by the Fourier transform lens 16, gathered into the recording medium 10, and formed into a point image having a high light intensity on the Fourier plane FF. Therefore, it is preferable that the recording medium 10 is disposed in the vicinity of the Fourier plane FF.

The recording medium 10 has, for example, a disk-like shape or a thin-plate-like shape, comprising a photorefractive polymer. In the case of the disk recording medium, the recording medium 10 is placed on a rotation table (not shown in the drawings), and the rotation table is driven by a drive unit that drives the rotation table around the rotational symmetry axis as its center. The drive unit is so configured that the rotation of the table or the like is controlled by the controller 30. According to a signal corresponding to a position-determining data from a photo-detector, the controller 30 controls the rotation position by driving the rotation table with a stepper motor or the like, and controls the relative position of the recording medium 10 with the signal-generating unit and the detector unit by shifting either the recording medium 10 or the signal-generating unit and the detector unit with a mechanism not shown in the drawings.

On the other hand, in the reference light beam optical system, a reference light beam 12b is reflected by mirrors 18 and 19 and projected to the recording medium 10. The reference light beam 12b is brought to intersect and cause interference with a signal light beam 12a from the lens 16 in a position inside the medium so that a three-dimensional interference pattern is formed. Thus, when recording data, the signal light and the reference light are simultaneously projected to a predetermined location in the recording medium 10, and the interference pattern is recorded as a refractive index grating in which the refractive index has been changed, as in the conventional system. The formation time of a hologram is controlled by releasing of the automatic shutter 6a.

Thus, information that is in the middle of Fourier transform is recorded in the recording medium 10. At the time of reproducing in the embodiment, inverse Fourier transform by means of an optical system is not carried out. A reproduced data from a hologram is reproduced as a Fourier transform pattern on the two-dimensional photo-detector 200 when a two-dimensional photo-detector 200 is disposed in the vicinity of the Fourier plane, and therefore, an output from the two-dimensional photo-detector 200 is computed based on a conversion table in a non-volatile memory ROM by the controller 30 according to inverse Fourier transform; and thus, an original data is obtained. In this configuration, an optical system of inverse Fourier transform lens is not required, and the size of the recording and reproducing system can be reduced. Such a conversion table can also include algorithms for data conversion and the like.

Figure 5:
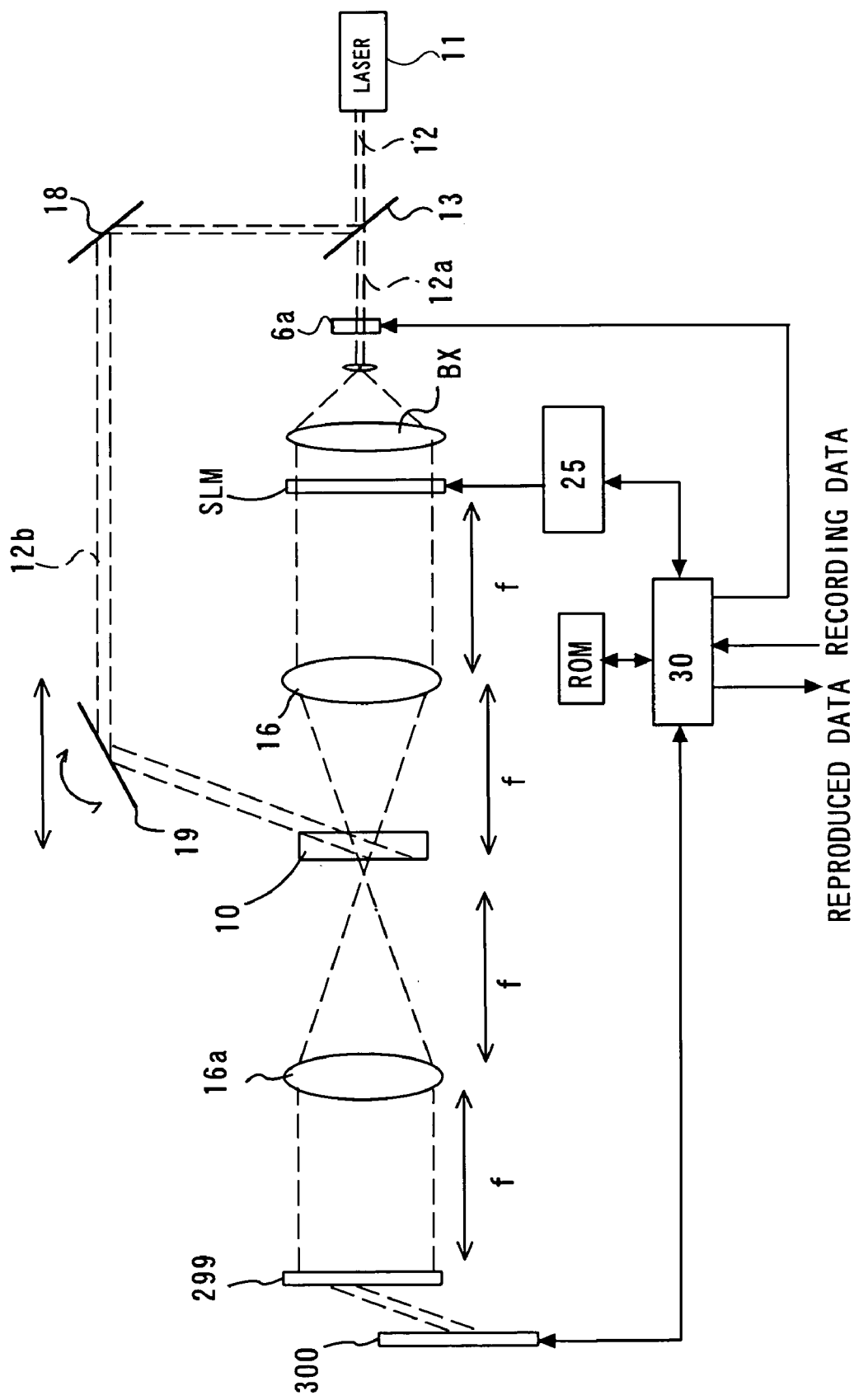
FIG. 5 is a diagrammatic view showing the configuration of another embodiment of the recording medium system according to the invention.

FIG. 5 shows one example of a second embodiment of the recording and reproducing system according to the invention.

Figure 1:
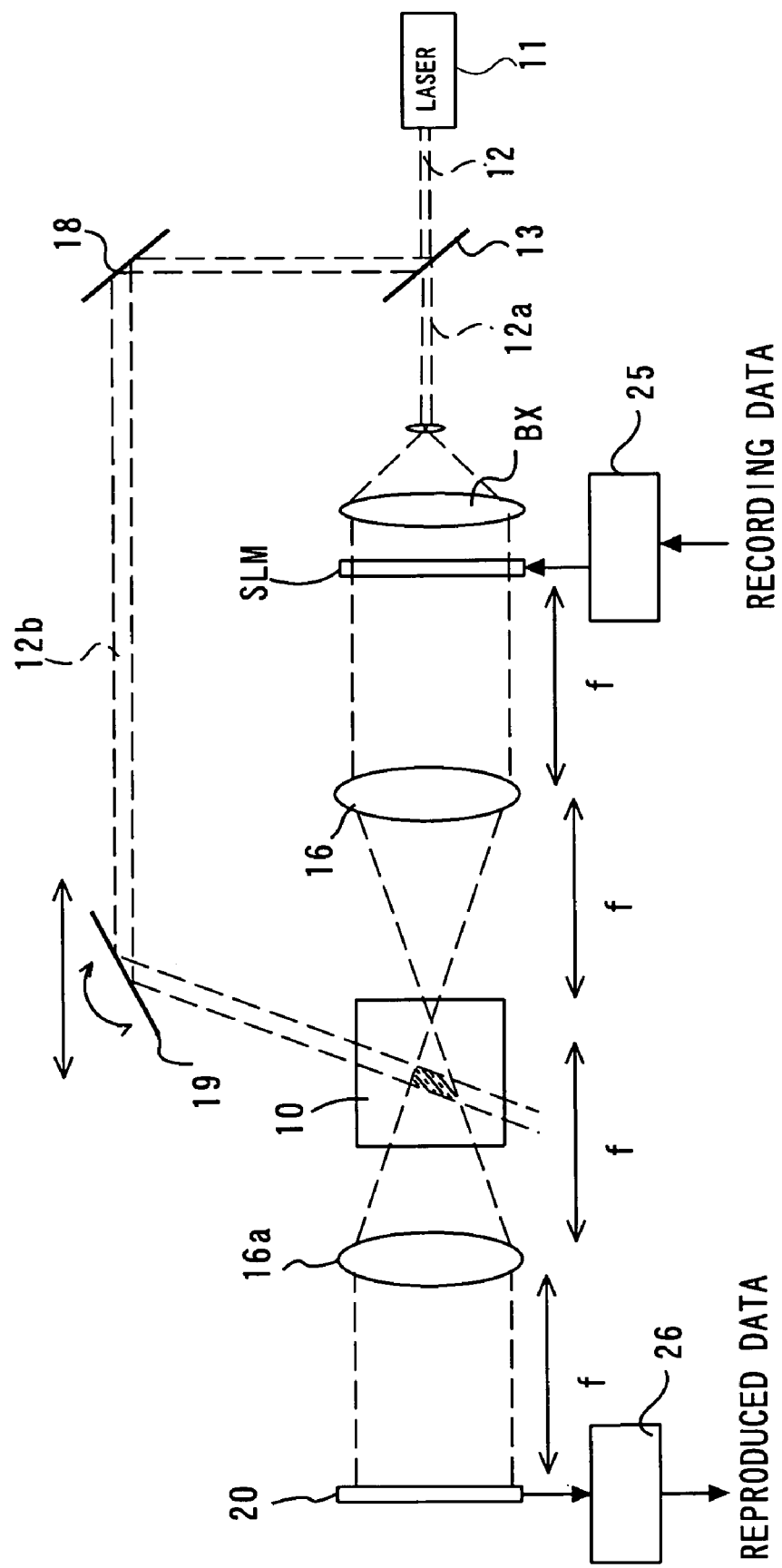
FIG. 1 is a diagrammatic view showing the configuration of a conventional recording medium system.
Figure 6:
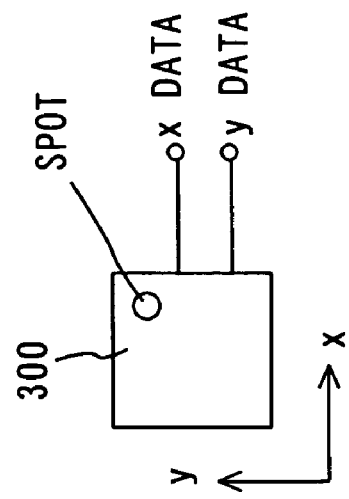
FIG. 6 is a view for illustrating a spot of a reference light beam that appears on a position sensor.

In this embodiment, as shown in FIG. 5, an inverse Fourier transform lens 16a is used unlike the first embodiment, and a reference data-holding hologram 299, not a photo-detector, is disposed at the focal point position. The reference data-holding hologram 299 generates diffracted light that corresponds to the reference light beam in which a reference data hologram is recorded, on a position sensor 300 disposed at a position spaced apart by a predetermined distance. This recording and reproducing system has a similar configuration to that of the conventional 4f system hologram recording system except the following; it is equipped with the reference data-holding hologram 299 and the position sensor 300, and it is also equipped with a non-volatile memory ROM that is connected to the controller 30 and stores data of a conversion table in which a positional data (x y data) that is output from the position sensor 300 corresponding to a spot of the reference light beam on the position sensor 300 and each data recorded in the reference data-holding hologram are uniquely associated, as shown in FIG. 6. Then, at the time of reproducing, the controller 30 computes a predetermined original data from the reproduced positional data according to the conversion table.

An operation of the 4f system hologram recording system of the second embodiment is described.

First, all the dot patterns that are produced by the spatial light modulator SLM or the portions for several pages to be used in recording are subjected to angle multiplexing, and a reference data hologram is formed in advance in the reference data-holding hologram 299 as a pre-format by a device not shown in the drawings. Then, as shown in FIG. 5, the reference data hologram 299 is disposed at the focal point position of the inverse Fourier transform lens 16a. In addition, a conversion table in which the respective angle values of the reference light in the angle multiplexing during the formation of the reference data-holding hologram 299 and all the dot patterns are associated is recorded in the non-volatile memory ROM of the recording and reproducing system in advance.

Next, at the time of recording, a refractive index grating corresponding to the dot pattern of the spatial light modulator SLM is recorded into the recording medium 10 using the signal light and the reference light as usual.

Next, at the time of reproducing, when the recording medium 10 is reproduced using a predetermined reference light, signal light is reproduced as usual and the signal light is projected into the reference data-holding hologram 299. Then, a diffracted light corresponding to the reference light having the angle recorded during the pre-formatting is generated as an intermediate data from the reference data-holding hologram 299, and it is detected by the position sensor and compared with the conversion table that is stored in the non-volatile memory ROM of the recording and reproducing system in advance; and thus, a desired dot pattern data is reconstructed.

Accordingly, even without using an expensive two-dimensional detector such as CCD as used in conventional cases, the configuration is possible with the position sensor 300, which is inexpensive. Furthermore, the CCD performs the transfer of electric charges (data) pixel by pixel and therefore cannot perform high-speed information transfer, but the position sensor 300 of this embodiment can perform high-speed detection and transfer of information.

It should be noted that the recording and reproducing system can also be configured by using recording media having a shape of body of revolution, such as circular cylinder, and recording media such as cards or the like, although a disk recording medium 10 is used in the foregoing example.

The invention claimed is:

1. A hologram recording and reproducing system comprising: a supporting unit for freely attachably supporting a recording medium including a photosensitive material; a signal light-generating unit for projecting a coherent light beam modulated according to a predetermined data into the recording medium and generating a diffraction grating by providing a three-dimensional light interference pattern in the recording medium; a detector unit for detecting and photoelectrically converting a diffracted light from the diffraction grating; and a demodulating unit for demodulating a predetermined data from an output from the detector unit, the hologram recording and reproducing system characterized in that: the detector unit has an intermediate data-generating unit for generating an intermediate data, and the demodulating unit has a conversion table in which the intermediate data and the predetermined data are uniquely associated, and demodulates the predetermined data by performing an operation based on a correlation in the conversion table, and in that: at the time of recording of the hologram recording and reproducing system, the predetermined data of image is recorded in the recording medium as the interference pattern of Fourier transformed pattern formed with an optical system, and at the time of reproducing, inverse Fourier transform is performed by the detector unit and the demodulating unit to reproduce the predetermined data of image.

2. The hologram recording and reproducing system according to claim 1, characterized in that the signal light-generating unit includes a reference light-generating unit for projecting a coherent reference light beam being the coherent light beam and having a first wavelength into the recording medium, modulates a coherent signal light beam being the coherent light beam and having the first wavelength according to the predetermined data, illuminates the recording medium with the signal light beam so that the signal light beam intersects the reference light beam within the recording medium, and generates a three-dimensional light interference pattern with the reference light beam.

3. The hologram recording and reproducing system according to claim 1 or 2, characterized in that the signal light-generating unit has a spatial light modulator, the detector unit has a photo-detector being the intermediate data-generating unit for generating the intermediate data, a light-receiving face of the photo-detector being disposed in the vicinity of a Fourier plane, and the recording medium is disposed in an upstream of the photo-detector.

4. The hologram recording and reproducing system according to claim 1 or 2, characterized in that the signal light-generating unit has a spatial light modulator, and the detector unit has an inverse Fourier transform lens, a reference data-holding hologram disposed at a focal point position of the inverse Fourier transform lens, and a position sensor that receives a diffracted light from the reference data-holding hologram and is disposed at a position spaced apart by a predetermined distance from the reference data-holding hologram, the position sensor being the intermediate data-generating unit for generating the intermediate data.

* * * * *